(12) United States Patent
Amigo (10) Patent No.: US 8,365,506 B2
(45) Date of Patent: Feb. 5, 2013

(54) PROCESS AND APPARATUS FOR CLOSING MESH BAGS

(75) Inventor: Ezequiel Amigo, Badalona (ES)

(73) Assignee: Girnet International, S.L., Badalona (ES)

( * ) Notice: Subject to any disclaimer, the term of this patent is extended or adjusted under 35 U.S.C. 154(b) by 525 days.

(21) Appl. No.: 12/640,561

(22) Filed: Dec. 17, 2009

(65) Prior Publication Data

US 2010/0154363 A1   Jun. 24, 2010

(30) Foreign Application Priority Data

Dec. 18, 2008  (ES) .................................. 200803592

(51) Int. Cl.
*B65B 51/10* (2006.01)
(52) U.S. Cl. ............................... 53/479; 53/413; 53/419
(58) Field of Classification Search .................... 53/413, 53/416, 417, 138.2–138.7, 139.4
See application file for complete search history.

(56) References Cited

U.S. PATENT DOCUMENTS

| | | | |
|---|---|---|---|
| 2,908,123 A | | 10/1959 | Muller et al. |
| 3,041,801 A | * | 7/1962 | Harrison .......................... 53/417 |
| 3,456,417 A | * | 7/1969 | Wright ............................. 53/417 |
| 3,540,184 A | * | 11/1970 | Ashton ........................... 53/415 |
| 3,763,621 A | * | 10/1973 | Klein et al. ..................... 53/439 |
| 4,223,508 A | * | 9/1980 | Wells ............................ 53/138.4 |
| 4,247,005 A | * | 1/1981 | Buxton ........................... 206/525 |
| 4,516,379 A | * | 5/1985 | Iain ............................... 53/138.4 |
| 6,088,999 A | | 7/2000 | Olaechea |
| 6,205,747 B1 | * | 3/2001 | Paniagua Olaechea ......... 53/417 |
| 8,167,488 B2 | * | 5/2012 | Giro Amigo .................... 383/21 |

FOREIGN PATENT DOCUMENTS

| | | |
|---|---|---|
| DE | 11 84 267 B | 12/1964 |
| DE | 44 21 366 A1 | 12/1995 |
| EP | 0 823 376 A1 | 2/1998 |
| EP | 1 988 027 A1 | 3/2008 |

OTHER PUBLICATIONS

Mar. 30, 2010, European Search Report and European Search Opinion.

* cited by examiner

*Primary Examiner* — Lindsay Low
(74) *Attorney, Agent, or Firm* — Sughrue Mion, PLLC (57) ABSTRACT

A process for closing mesh bags, in which a longitudinal portion of constricted mesh is compressed together with a portion of at least one plastic strip provided with a width greater than that of the constricted mesh such that respective side bands of the strip project on both sides of the constricted mesh, includes the operations of introducing in a die the compressed longitudinal portions of strip and mesh such that the mentioned side bands are bent towards the constricted mesh. The bent side bands of the strip are folded over the constricted mesh the materials forming the folded strip and the constricted mesh melt. One or several attachment sections between the folded strip and the constricted mesh along the compressed portions of the mesh and of the strip are determined.

6 Claims, 8 Drawing Sheets

PROCESS AND APPARATUS FOR CLOSING MESH BAGS

TECHNICAL FIELD OF THE INVENTION

The invention relates to a process for closing mesh bags, particularly applicable to the closing of tubular mesh bags of heat-sealable material, in which a longitudinal portion of constricted mesh is compressed together with at least one portion of plastic strip, to which it is subsequently attached by means of the melting of the materials forming the mesh and the strip.

The invention also relates to an apparatus for putting the process into practice, intended to form part of an automatic bag making machine.

BACKGROUND OF THE INVENTION

Patent document EP 1988027 discloses a particular type of bag, obtained from a longitudinal portion of tubular mesh the ends closed by constriction of which are attached by means of at least one oblong and flexible element, such as a plastic strip, acting as a handle.

From among the different operations necessary for the obtaining of said bag, the ones referring to the closing thereof stand out. To perform each closing operation of the bag, it is necessary to apply a longitudinal portion of the tubular mesh, previously constricted, against a longitudinal portion of the strip or strips with which the mesh is to be made integral, and handle the assembly formed by the mesh and the strip for their subsequent attachment. An objective of the present invention is to disclose a process suitable for closing a bag of this type and an apparatus for putting the process into practice repetitively and automatically.

DISCLOSURE OF THE INVENTION

The process according to the invention is essentially characterized in that at least one of the strips which is made integral with the mesh has a width greater than that of the mentioned longitudinal portion of constricted mesh, said strip being applied in a longitudinal direction on the longitudinal portion of constricted mesh such that respective side bands of the strip project on both sides of the constricted mesh, the process further comprising the operations of introducing in a die the compressed longitudinal portions of strip and mesh, the die being configured such that the mentioned side bands are bent towards the constricted mesh; folding the bent side bands of the strip over the constricted mesh; and causing the melting of the materials forming the folded strip and the constricted mesh, determining one or several attachment sections between the folded strip and the constricted mesh along the compressed portions of the mesh and of the strip.

Preferably, since the compressed portion of mesh is a non-end portion of a continuous tubular mesh, the process comprises the additional operation of jointly and transversely cutting the attached portions of the constricted mesh and of the strip, such that one of the attachment sections between the folded strip and the constricted mesh or a segment of an attachment section remains on both sides of the cut made, two separated and closed ends of one and the same or of respective mesh bags, made simultaneously, thus being obtained.

According to another feature of the invention, the melting of the materials is carried out by means of ultrasounds; and in each melting operation two longitudinally separated attachment sections between the folded strip and the mesh are formed, the cutting of the attached portions of constricted mesh and of the strip being performed through a mid-point between the mentioned attachment sections.

In a variant of the invention, the portion of strip which is attached to one of the two closed ends obtained is attached without interruption to a roll of continuous strip; and the portion of strip which is applied on the constricted mesh in the following performance of the closing process is a section of strip of the same roll of continuous strip.

According to another aspect of the invention, an apparatus for putting the process into practice in an automated manner is disclosed. The apparatus is suitable for closing tubular mesh bags of heat-sealable material from a longitudinal portion of constricted mesh and from a portion of at least one plastic strip, with a width greater than that of the mentioned longitudinal portion of constricted mesh and applied in a longitudinal direction on the longitudinal portion of constricted mesh, such that respective side bands of the strip project on both sides of the constricted mesh. The apparatus is essentially characterized in that it comprises a die, provided with a groove with a width less than of the strip, and a mobile carriage, movable according to an alternate linear back and forth movement between the extreme positions of start and end of run, towards the die, and vice versa, on which they are assembled such that they automatically and consecutively handle the assembly formed by the mesh and the strip arranged between the carriage and the die, as the carriage moves from the start position towards the final position of the run thereof, transverse constriction means for a longitudinal portion of mesh; introducing means for compressing and introducing in the die the mentioned portion of constricted mesh and the portion of strip on which the mesh is applied, causing the bending of the side bands of the strip towards the constricted mesh; and folding means for folding the bent side bands of the strip over the constricted mesh; the apparatus also comprising welding means by the melting of the materials forming the mesh and the strip, optionally assembled in the mobile carriage, suitable for forming one or several attachment sections between the folded strip and the constricted mesh along the compressed portions of the mesh and of the strip.

According to another feature of the invention, the folding means comprise at least one pushing body, provided with an arched concavity suitable for receiving the side bands of the strip and for gradually folding them over the constricted mesh as said pushing body advances towards the die, when the carriage moves in the same direction.

According to another feature of the apparatus, the latter comprises transverse cutting means for jointly and transversely cutting the attached portions of the constricted mesh and of the strip, and the welding means comprises at least one sonotrode the welding head of which is configured in the form of a fork, two separated terminations being distinguished, each of which is intended to cause the melting of the materials forming the strip and the mesh to form respective attachment sections between the constricted mesh and the folded strip, between which the blade of the transverse cutting means is slid.

In a particularly interesting embodiment, the transverse constriction means and the introducing means are assembled in the carriage with the capacity to slide with respect to the latter and in the direction of movement of the carriage, and are subjected to the action of respective elastic means forcing them to adopt respective initial positions and predetermined positions of action with respect to the carriage, such that when the carriage advances towards the die, they act progressively and sequentially on the mesh and the strip and stop likewise successively in their movement, as the carriage advances towards the die, due to the contact with respective limit stops, successively recovering their initial position due to the effect of the elastic means when the carriage moves back.

Optionally, the folding means are also assembled in the carriage with the capacity to slide with respect to the latter and in the direction of movement of the carriage, subjected to the action of corresponding elastic means forcing them to adopt respective initial positions and predetermined positions of actions with respect to the carriage.

According to another feature, the constriction means comprise two parallel plates, provided with respective vertically aligned recesses at an angle, between which the introducing means are arranged, which introducing means comprise two vertically aligned hold-down plates between which the folding means comprising two pushing bodies are arranged.

BRIEF DESCRIPTION OF THE DRAWINGS

The attached drawings show, by way of a non-limiting example, a sequence of action of an apparatus according to the invention together with respective schematic depictions of the steps of the process which are carried out in each instant of said sequence. Specifically.

DETAILED DESCRIPTION OF THE DRAWINGS

Figure 7:
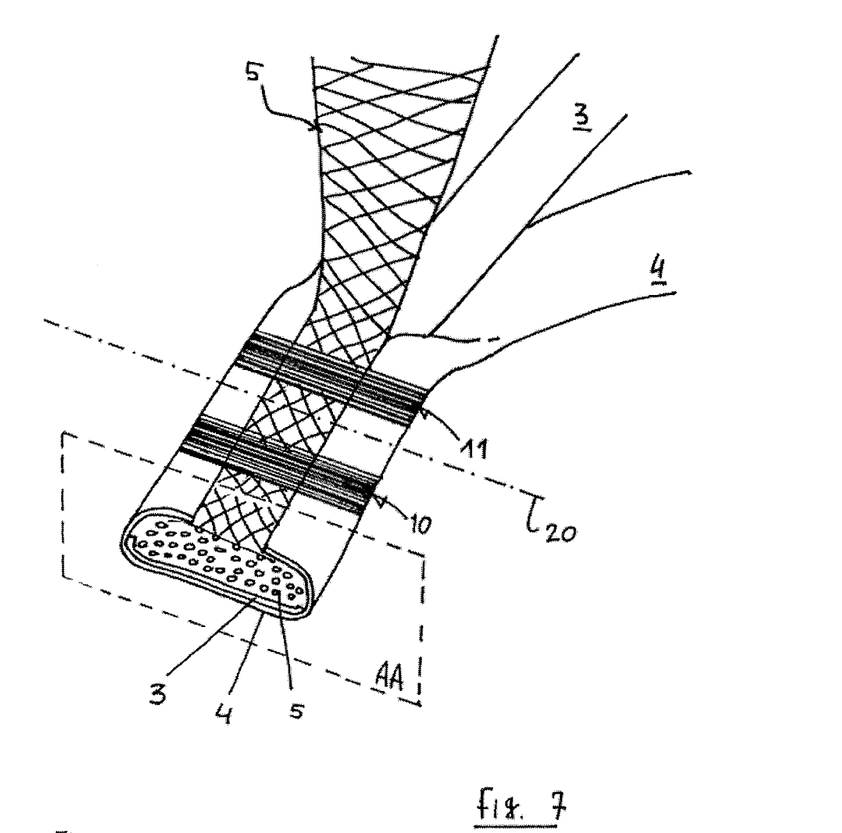
FIG. 7 is a perspective and detailed view of the assembly formed by the tubular mesh and the strips in the step of the process depicted in FIG. 4c, sectioned according to the cross-sectional plane AA.

FIGS. 1, 2, 3a, 4a and 5a depict a plan view of an apparatus 1 suitable for handling a longitudinal portion of a tubular mesh 5 tubular (seen in cross-section in FIG. 1) and respective plastic strips 3 and 4 for closing a tubular mesh bag of the type depicted in FIG. 7.

Figure 1:
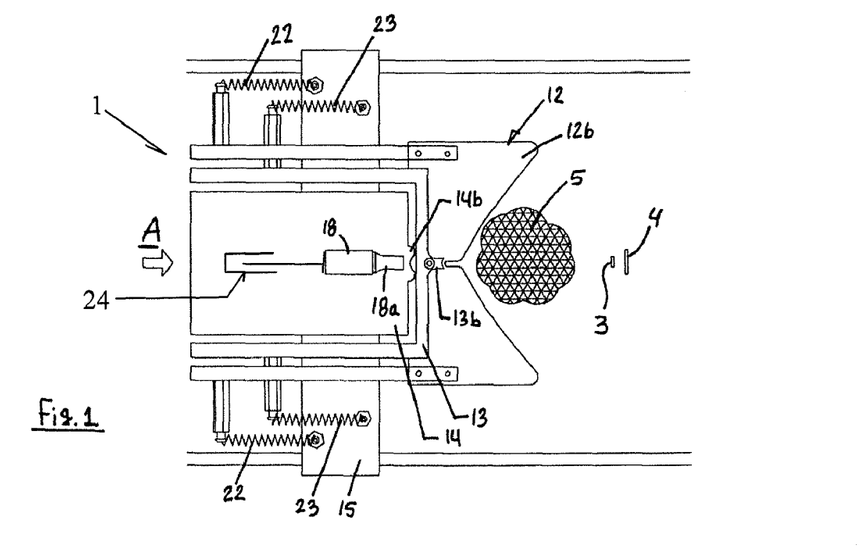
FIGS. 1, 2, 3a, 4a and 5a are respective schematic views of an apparatus for closing bags according to the invention in different steps of operation.
Figure 3B:
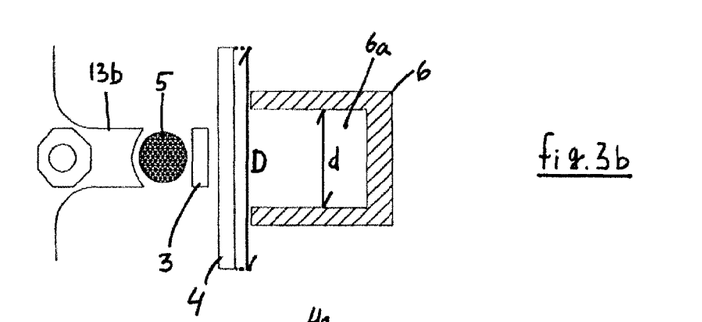
FIGS. 3b, 3c, 4b, 4c and 5b are a sequence of the operations which are carried out on a longitudinal portion of constricted tubular mesh and two plastic strips for their irreversible attachment.
Figure 3C:
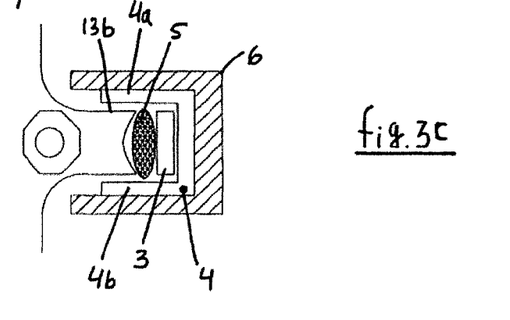
Figure 4A:
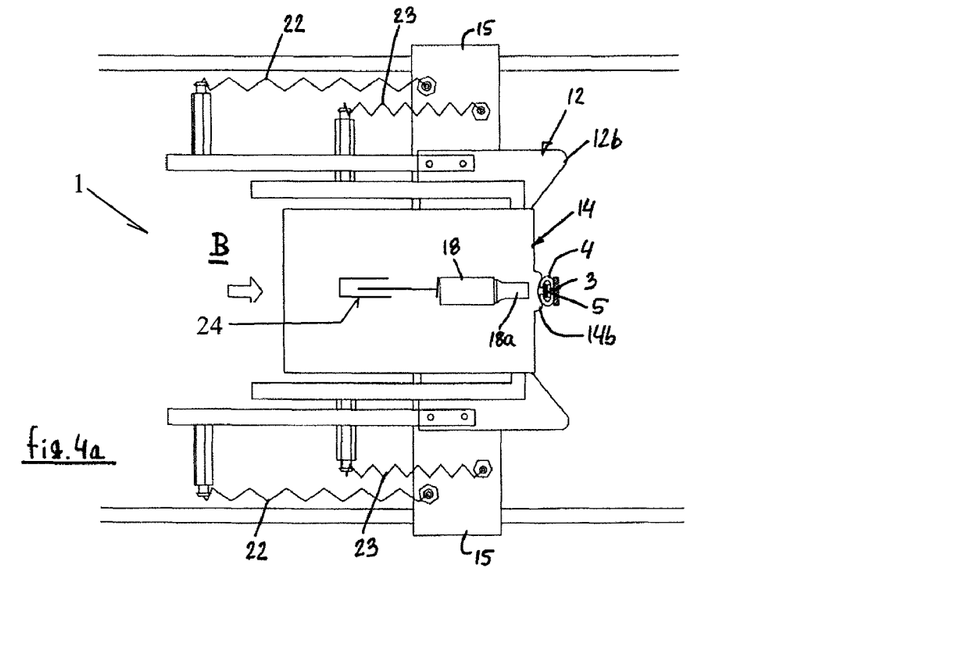
Figure 4B:
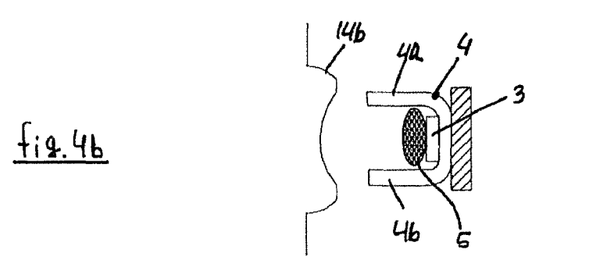
Figure 4C:
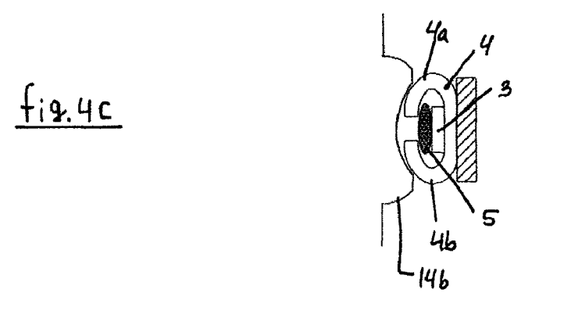
Figure 5A:
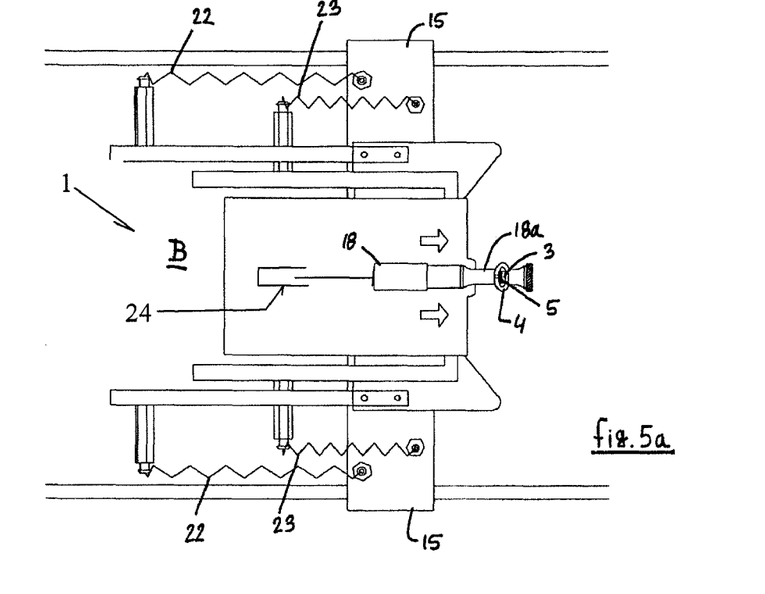
Figure 5B:
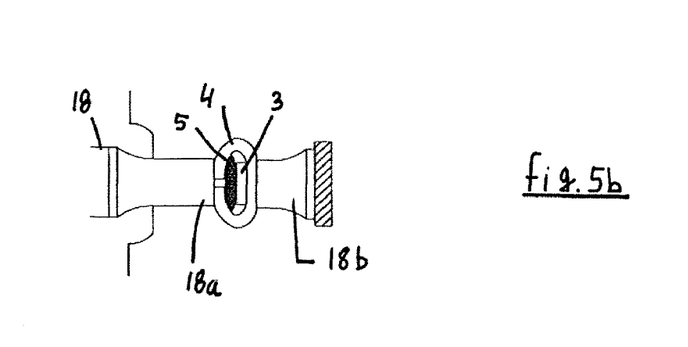

The apparatus 1 comprises a mobile carriage 15, movable according to a linear and alternate back and forth movement, in a direction perpendicular to the tubular mesh 5, between the extreme positions A and B, of start and end of run, depicted in FIG. 1 and in FIGS. 4a and 5a, respectively. On the carriage 15 there are assembled, among others, constriction means 12 for a longitudinal portion of the mesh 5, which constrict and apply the mentioned portion of constricted mesh 5 against the superimposed strips 3 and 4; introducing means 13, for introducing in a fixed die 6 the mentioned portion of constricted mesh and the portions of the strips 3 and 4 which are applied on the mesh 5; and folding means 14, the form and function of which will be explained in detail below. The transverse constriction means 12, the introducing means 13 and the folding means 14 are involved in the first steps of the process depicted in FIGS. 2, 3b, 3c 4b and 4c in the manner which is explained below:

Starting from the initial situation depicted in FIG. 1, the carriage 15 advances towards the tubular mesh 5, as indicated by the arrow of FIG. 1. The carriage 15 drags in its movement the constriction means 12, which are formed by a set of superimposed parallel plates (of which only the lower plate 12b is visible) provided with respective recesses 12c which are considerably at a right angle, the purpose of which is to gather the mesh 5 in the vertices of said recesses 12c and move it until applying it against the strips 3 and 4, all of this as shown in FIG. 2.

The constriction means 12 are movable assembled in the carriage 15, in the direction of advance thereof, being connected with the latter by elastic means 22 acting under traction and tending to place them in the position depicted in FIG. 1. When the constriction means 12 have performed their function, they stop when they reach corresponding stop means, not shown, despite the fact that the carriage 15 continues its advance in the direction indicated by the arrow of FIG. 2. The advance of the carriage 15 causes, however, the elastic means 22 to expand, such that when the carriage 15 starts its movement in the opposite direction, the elastic means 22 tend to recover their original shape and exert a force on the constriction means 12, in a direction opposite to that of advance of the carriage 15, enough to move them with respect to the latter and place them again in the predetermined position of action depicted in FIGS. 1 and 2.

Figure 2:
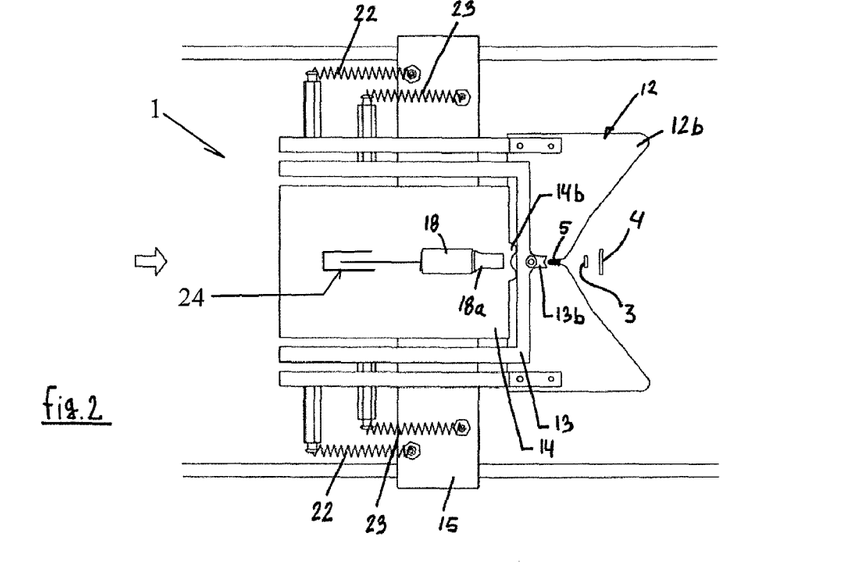
Figure 3A:
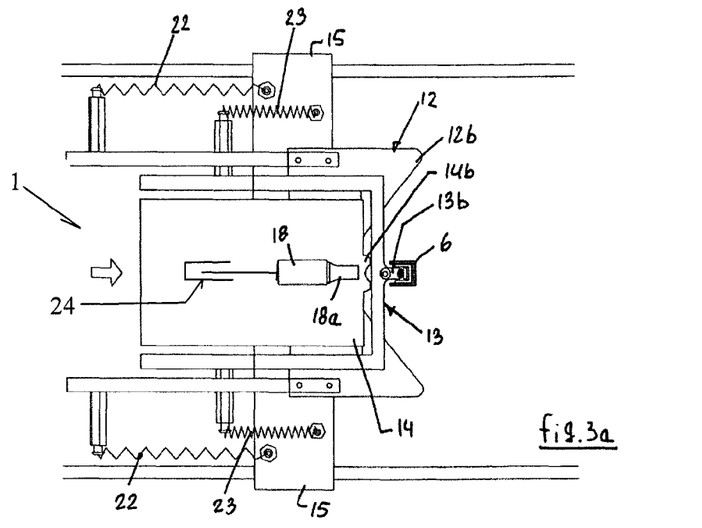

It can be seen in FIG. 2 that the strip 4 has a width D greater than that of the longitudinal portion of the constricted mesh 5, such that respective side bands 4a and 4b of the strip 4 project on both sides of the constricted mesh 5, which side bands are necessary to carry out the following steps of the process, all of this as depicted in FIGS. 3b and 3c.

Indeed, when the carriage 15 continues its movement in the direction indicated by the arrow of FIG. 3a, the introducing means 13 reach the assembly formed by the constricted mesh 5 and the strips 3 and 4, such that they force the introduction thereof in the fixed die 6 provided with a groove 6a, with a width d less than that of the strip 4, whereby the side bands 4a and 4b of the latter are bent towards the constricted mesh 5, all of this as indicated by the sequence of FIGS. 3b and 3c.

In the example apparatus 1, the introducing means 13 are formed by two hold-down plates, of which only the lower hold-down plate 13b is visible, placed one on top of another, vertically aligned and separated, arranged between the two parallel plates forming the constriction means 12, whereby the bending of the side bands 4a and 4b of the strip 4 in two longitudinally separated sections along the portion of the constricted mesh 5 actually occurs.

Similarly to the constriction means 12, the introducing means 13 are movably assembled in the carriage 15 and are connected with the latter by means of elastic means 23, acting under traction, tending to place them with respect to the carriage 15 in the position depicted in FIGS. 1, 2 and 3a. When the introducing means 13 have performed their function, their advance is prevented by abutment against the bottom of the die 6, despite the fact that the carriage 15 continues its advance in the direction indicated by the arrow of FIG. 4a. The advance of the carriage 15 causes, however, the elastic means 23 to expand, causing an increasing force of the introducing means 13 on the die 6. When the carriage 15 starts its movement in the opposite direction, the elastic means 23 tend to recover their original shape, and likewise return the introducing means 13 to their predetermined position of action depicted in FIGS. 1, 2 and 3a.

When the carriage 15 continues its movement in the direction indicated by the arrow of FIG. 4a, the folding means 14 reach the assembly formed by the constricted mesh 5 and the strips 3 and 4. These folding means are configured to fold the previously bent side bands 4a and 4b over the constricted mesh 5 as depicted in the sequence of FIGS. 4b and 4c. In the apparatus 1 depicted, the folding means 14 are formed by two pushing bodies, of which only the lower pushing body 14b is visible, provided with an arched concavity suitable for receiving the side bands 4a and 4b of the strip 4 and for gradually folding them over the constricted mesh 5 as they advance towards the constricted mesh. These pushing bodies forming the folding means 14 are placed one on top of another, vertically aligned and separated, arranged between the two hold-down plates 13a and 13b forming the introducing means 13, whereby there is actually a direct action on the side bands 4a and 4b of the strip 4 at two longitudinally separated points along the portion of the constricted mesh 5. The rigidity of the strip 4 causes the folding to be effective in the entire section of the constricted mesh 5 comprised between said points of action of the folding means 14.

When the assembly formed by the mesh 5 and the strips 3 and 4 is in the situation depicted in FIG. 4c, the melting of the materials forming the strips 3 and 4 and the mesh 5 is caused, forming two attachment sections 10 and 11 between the constricted mesh 5 and the strips 3 and 4. Once the necessary time for the cooling of these attachments has elapsed, the compressed sections of the mesh 5 and of the strips 3 and 4 are transversely cut, such that a respective attachment section 10 and 11 remains on both sides of the cut made, which attachment section has a sufficient length to ensure that the accidental opening of the closed ends made, and therefore the opening of the bag or bags, does not occur.

To that end, the apparatus 1 is provided, in addition to welding means 18, with cutting means, not shown, suitable for transversely cutting the assembly formed by the constricted mesh 5 and the strips 3 and 4, now firmly attached to the mentioned mesh 5, along the cutting line 20 indicated in FIG. 7.

In relation to the welding means, they comprise a sonotrode 18a, driven by means of a pneumatic cylinder 24, movable towards the assembly formed by the constricted mesh 5 and the strips 3 and 4, which compresses said assembly towards a counter-sonotrode 18b, arranged on the other side of the constricted mesh 5 and the strips 3 and 4.

Figure 8:
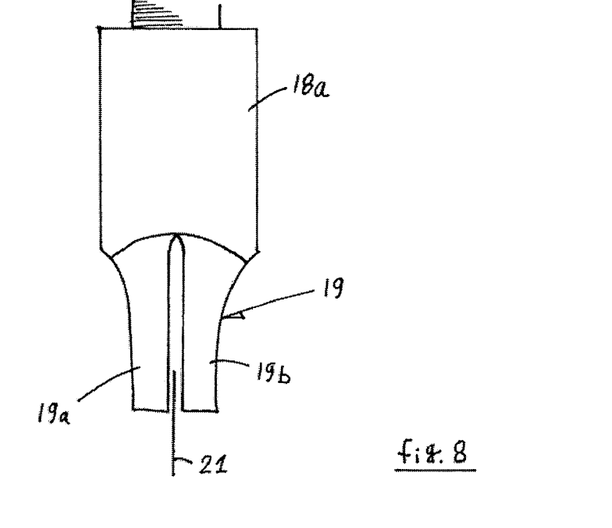
FIG. 8 is a depiction of a sonotrode suitable for putting an embodiment variant of the process according to the invention into practice.

The sonotrode 18a is arranged, in the apparatus 1 depicted, between the two pushing bodies 14a and 14b forming the folding means 14 and, as observed in FIG. 8, the welding head 19 is configured in the form of a fork, two separated terminations 19a and 19b being distinguished, each intended to cause the melting of the materials forming the strips 3 and 4 and the mesh 5 to form respective attachment sections 10 and 11 between the constricted mesh 5 and the strips 3 and 4, furthermore allowing the cutting blade 21 of the cutting means to slide between said terminations 19a and 19b.

Figure 6:
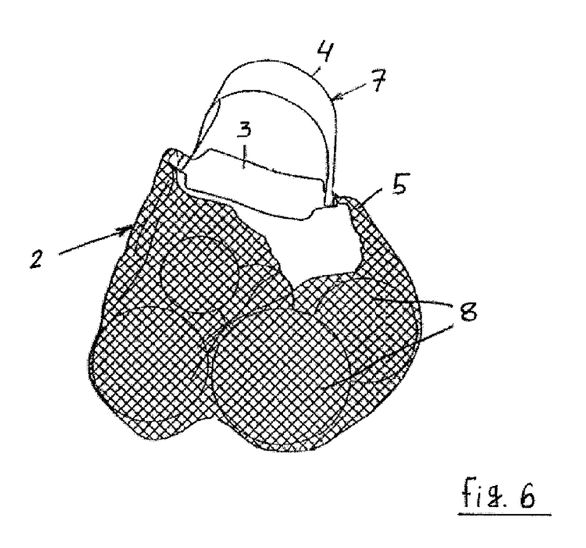
FIG. 6 is a depiction of a tubular mesh bag the closed ends of which have been made by means of the process according to the invention.

The described process is particularly suitable for the making of a bag 2 according to FIG. 6, which houses therein the products 8 to be packaged. To obtain this bag 2, a non-end longitudinal portion of a continuous tubular mesh 5 is constricted and two plastic strips 3 and 4 are used such that the portions of the strips 3 and 4 which are attached to the mesh 5 in each attachment operation are attached without interruption to respective rolls of continuous strip, and such that in the following attachment operation new portions of the same strips 4 and 3, which will subsequently be separated by the cutting of the respective rolls of continuous strip, are attached to the same mesh 5, previously filled with the products 8 which are to be packaged.

Figure 9:
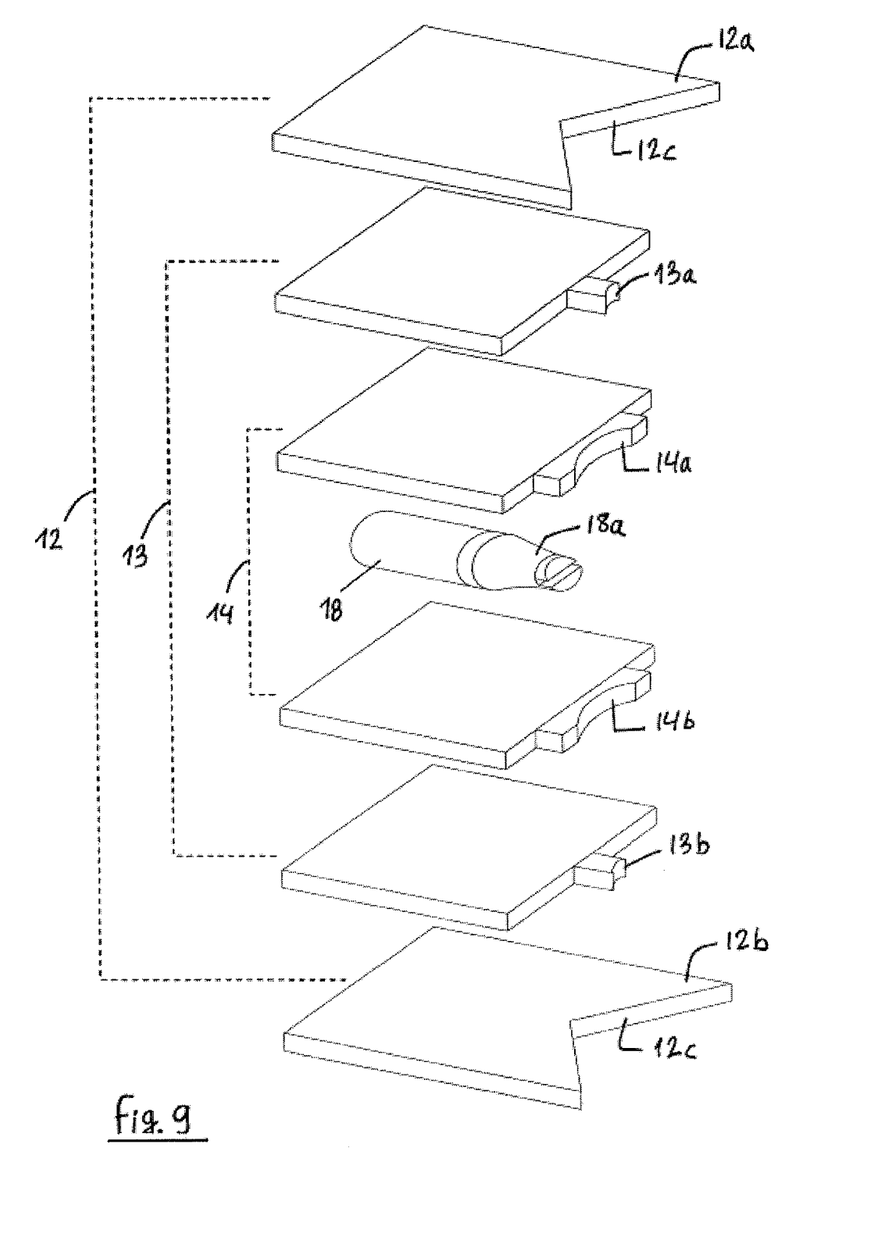
FIG. 9 is an exploded and schematic view according to a variant of the apparatus according to the invention, of the constriction means, the introducing means, the folding means and the welding means, assembled in the mobile carriage of the apparatus.

According to a variant of interest depicted in FIG. 9, the constriction means 12 comprise two parallel plates 12a and 12b, upper and lower respectively, provided with respective vertically aligned recesses 12c at an angle, between which there are arranged the introducing means 13, comprising two hold-down plates 13a and 13b, vertically aligned with one another, between which there are arranged the folding means 14, comprising two pushing bodies 14a and 14b vertically aligned with one another, between which the sonotrode 18a forming part of the welding means 18 is movably assembled. Naturally, and despite the fact that they are depicted aligned, the constriction means 12, the introducing means 13 and the folding means 14 adopt a position with respect to the carriage 15 in accordance with the order of action on the mesh 5 and the strips 3 and 4, as depicted in FIGS. 1 and 2, when the carriage starts its run towards the die 6.

Figure 10:
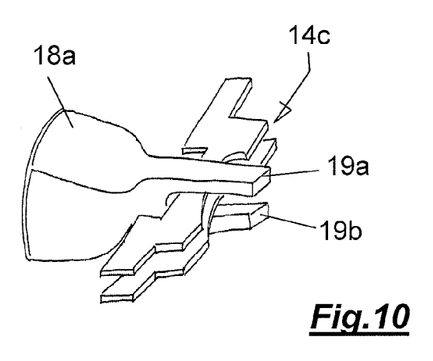
FIG. 10 is a view of the welding means according to another variant of the invention.

In the variant of FIG. 10, a pair of additional pushing bodies 14c is arranged between the two terminations 19a and 19b of the welding head 19 of the sonotrode 18a, which pushing bodies are added to the pushing bodies depicted in FIG. 9. The pair of additional pushing bodies 14c moves together with the welding head 19 and fulfill a function similar to that of the pushing bodies 14a and 14 of the folding means 14, and for this purpose they are provided with an arched concavity suitable for receiving the side bands of the strip which may be slightly raised and ensuring the folding thereof over the mesh in the area close to the welding. In a variant of the invention, it is provided that the additional pushing bodies 14c can move in a guided manner with respect to the head of the sonotrode, towards the mesh and the strips.

The invention claimed is:

1. An apparatus (1) for closing tubular mesh bags of heat-sealable material from a longitudinal portion of constricted mesh (5) and from a portion of at least one plastic strip (4), with a width (D) greater than that of the longitudinal portion of constricted mesh and applied in a longitudinal direction on the mentioned longitudinal portion of constricted mesh, such that respective side bands (4a, 4b) of the strip project on both sides of the constricted mesh, comprising a die (6) and a mobile carriage (15), between which the mesh and the strip can be arranged, the die being provided with a groove (6a) with a width (d) less than that of the strip and the carriage being movable according to an alternate linear back and forth movement between the extreme positions of start (A) and end (B) of run, towards the die, and vice versa, being assembled on the carriage, such that they automatically and consecutively operate the assembly formed by the mesh and the strip, as the carriage moves from the start position towards the final position of the run thereof, transverse constriction means (12) for a longitudinal portion of mesh, capable of constricting and applying the mentioned longitudinal portion of mesh against a portion of the plastic strip;

introducing means (13) for compressing and introducing in the die the mentioned portion of constricted mesh and the portion of the strip on which the mesh is applied, causing the bending of the side bands of the strip towards the constricted mesh; and folding means (14) for folding the bent side bands of the strip over the constricted mesh;

the apparatus further comprising:

welding means (18) by the melting of the materials forming the mesh and the strip, suitable for forming one or several attachment sections (10, 11) between the folded strip and the constricted mesh along the compressed portions of the mesh and of the strip, wherein the folding means (14) comprise at least one pushing body (14a, 14b), provided with an arched concavity suitable for receiving the side bands (4a, 4b) of the strip (4) and for gradually folding them over the constricted mesh (5) as said pushing body advances towards the die (6), when the carriage (15) moves in the same direction.

2. The apparatus (1) according to claim 1, wherein the constriction means (12) comprises two parallel plates (12a, 12b), provided with respective vertically aligned recesses (12c) at an angle, between which the introducing means (13) are arranged, which introducing means comprise two vertically aligned hold-down plates (13a, 13b) between which the folding means (14), comprising two pushing bodies (14a, 14b), are arranged.

3. An apparatus (1) for closing tubular mesh bags of heat-sealable material from a longitudinal portion of constricted mesh (5) and from, a portion of at least one plastic strip (4), with a width (D) greater than that of the longitudinal portion of constricted mesh and applied in a longitudinal direction on the mentioned longitudinal portion of constricted mesh, such that respective side bands (4a, 4b) of the strip project on both sides of the constricted mesh, comprising a die (6) and a mobile carriage (15), between which the mesh and the strip can be arranged, the die being provided with a groove (6a) with a width (d) less than that of the strip and the carriage being movable according to an alternate linear back and forth movement between the extreme positions of start (A) and end (B) of run, towards the die, and vice versa, being assembled on the carriage, such that they automatically and consecutively operate the assembly formed by the mesh and the strip, as the carriage moves from the start position towards the final position of the run thereof,
 transverse constriction means (12) for a longitudinal portion of mesh, capable of constricting and applying the mentioned longitudinal portion of mesh against a portion of the plastic strip;
 introducing means (13) for compressing and introducing in the die the mentioned portion of constricted mesh and the portion of the strip on which the mesh is applied, causing the bending of the side bands of the strip towards the constricted mesh; and
 folding means (14) for folding the bent side bands of the strip over the constricted mesh;
 the apparatus further comprising:
  welding means (18) by the melting of the materials forming the mesh and the strip, suitable for forming one or several attachment sections (10, 11) between the folded strip and the constricted mesh along the compressed portions of the mesh and of the strip,
 transverse cutting means for jointly and transversely cutting the attached portions of the constricted mesh and of the strip, and in that the welding means (18) comprises at least one sonotrode (18a) the welding head (19) of which is configured in the form of a fork, two separated terminations (19a, 19b) being distinguished, each of which is intended to cause the melting of the materials forming the strip and the mesh to form respective attachment sections (10, 11) between the constricted mesh (5) and the folded strip (4), between which a blade (21) of the transverse cutting means (17) is slid.

4. The apparatus according to claim 3, wherein the sonotrode (18a) is driven by means of a pneumatic cylinder (24) towards the assembly formed by the constricted mesh (5) and the strips (3), and in that between the two terminations (19a, 19b) of the head (19) of said sonotrode there is arranged at least one additional pushing body, with mobility with respect to the sonotrode in the direction of advance thereof, formed by a plate provided with an arched concavity suitable for receiving the side bands of the strip which may be slightly raised and ensuring the folding thereof over the mesh in the area close to the welding.

5. An apparatus (1) for closing tubular mesh bags of heat-sealable material from a longitudinal portion of constricted mesh (5) and from a portion of at least one plastic strip (4), with a width (D) greater than that of the longitudinal portion of constricted mesh and applied in a longitudinal direction on the mentioned longitudinal portion of constricted mesh, such that respective side bands (4a, 4b) of the strip project on both sides of the constricted mesh, comprising a die (6) and a mobile carriage (15), between which the mesh and the strip can be arranged, the die being provided with a groove (6a) with a width (d) less than that of the strip and the carriage being movable according to an alternate linear back and forth movement between the extreme positions of start (A) and end (B) of run, towards the die, and vice versa, being assembled on the carriage, such that they automatically and consecutively operate the assembly formed by the mesh and the strip, as the carriage moves from the start position towards the final position of the run thereof,
 transverse constriction means (12) for a longitudinal portion of mesh, capable of constricting and applying the mentioned longitudinal portion of mesh against a portion of the plastic strip;
 introducing means (13) for compressing and introducing in the die the mentioned portion of constricted mesh and the portion of the strip on which the mesh is applied, causing the bending of the side bands of the strip towards the constricted mesh; and
 folding means (14) for folding the bent side bands of the strip over the constricted mesh;
 the apparatus further comprising:
  welding means (18) by time melting of the materials forming the mesh and the strip, suitable for forming one or several attachment sections (10, 11) between the folded strip and the constricted mesh along the compressed portions of the mesh and of the strip, wherein the transverse constriction means (12) and the introducing means (13) are assembled in the carriage (15) with the capacity to slide with respect to the latter and in the direction of movement of the carriage, and are subjected to the action of respective elastic means (22, 23) forcing them to adopt respective initial positions and predetermined positions of action with respect to the carriage, such that when the carriage advances towards the die (6), they act progressively and sequentially on the mesh and the strip and stop likewise successively in their movement, as the carriage advances towards the die, due to the contact with respective limit stops, successively recovering their initial position due to the effect of the elastic means when the carriage moves back in the direction opposite to the die.

6. The apparatus according to claim 5, wherein the folding means (14) are also assembled in the carriage (15) with the capacity to slide with respect to the latter and in the direction of movement of the carriage, subjected to the action of corresponding elastic means forcing them to adopt respective initial positions and predetermined positions of actions with respect to the carriage.

* * * * *